Patented Oct. 15, 1946

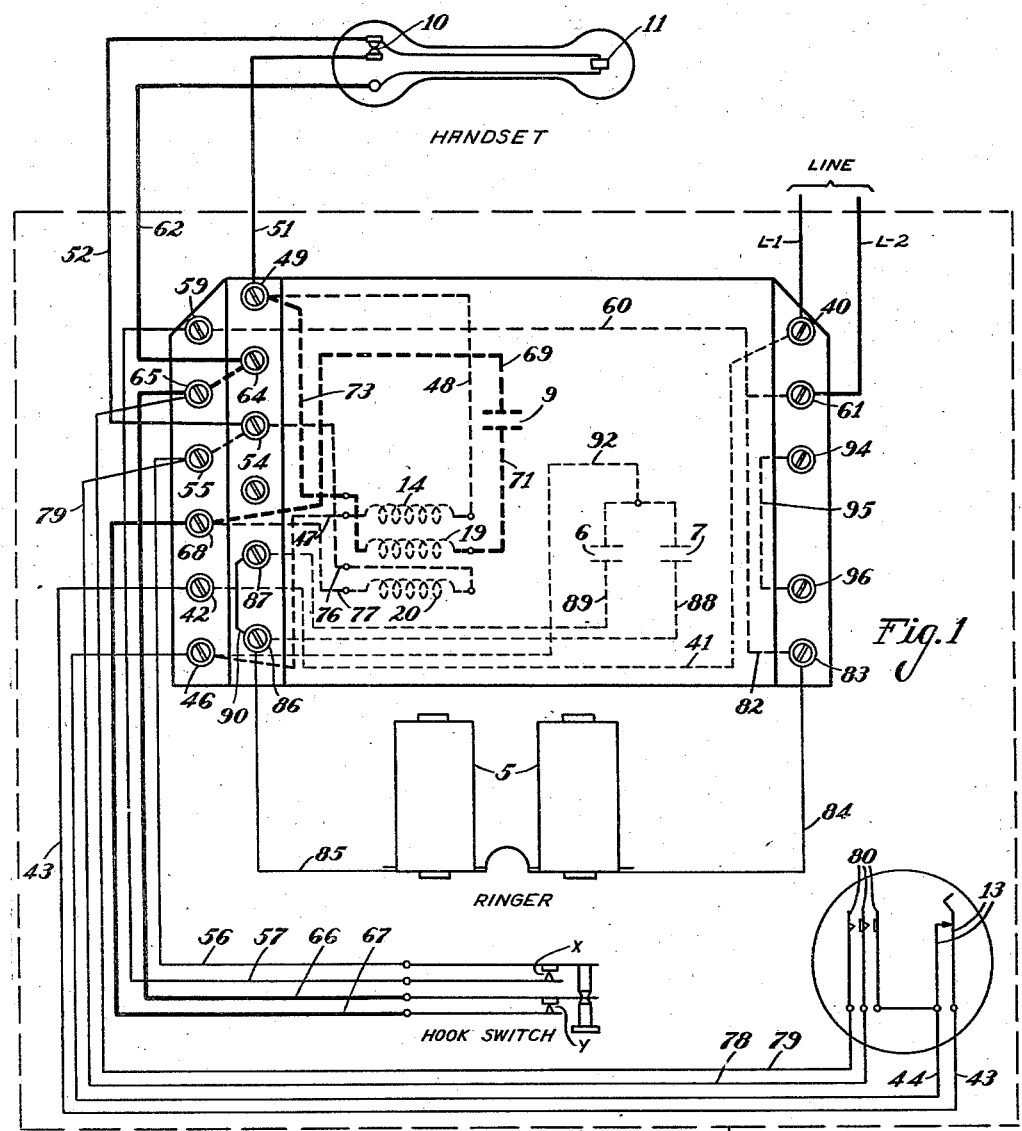
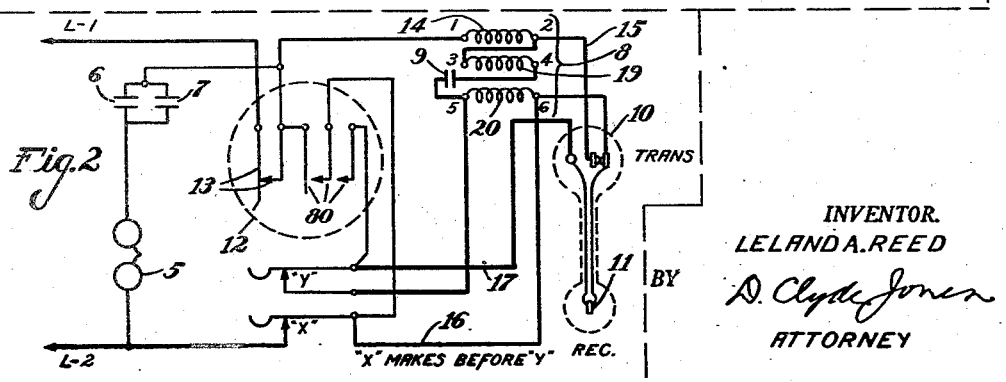

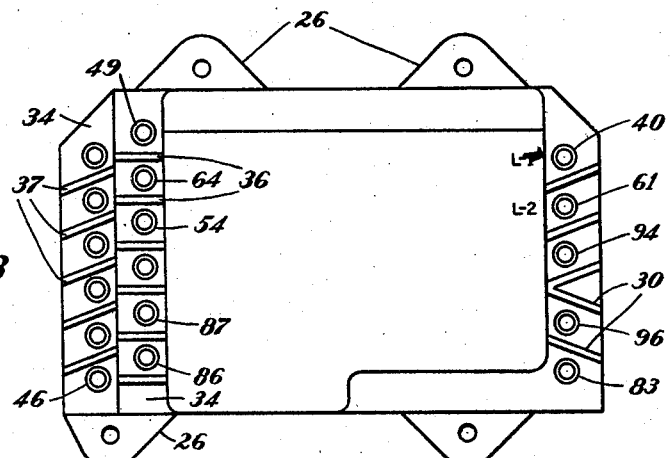
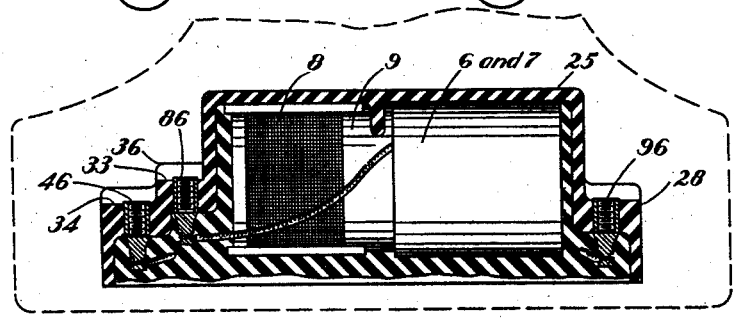
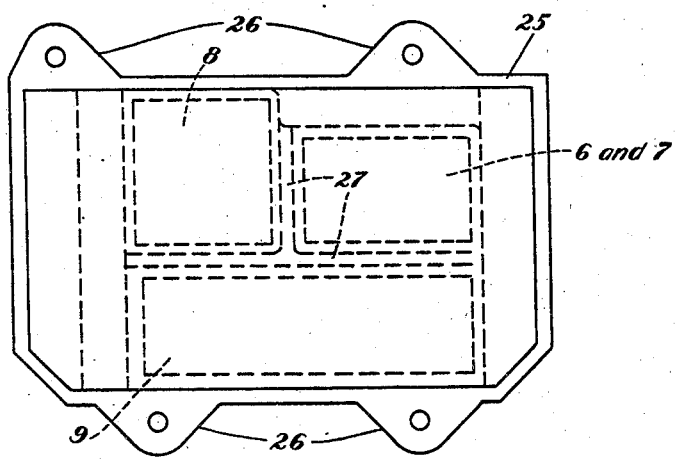

2,409,588

UNITED STATES PATENT OFFICE 2,409,588

TELEPHONE SUBSTATION APPARATUS

Leland A. Reed, Rochester, N. Y., assignor to The Stromberg-Carlson Company, Rochester, N. Y., a corporation of New York Application June 27, 1944, Serial No. 542,344

4 Claims. (Cl. 179—100)

1

This invention relates to a novel construction of the component parts provided in a subscriber's substation apparatus and especially within the bell box forming a part thereof, either where this bell box is used as a separate part of the apparatus or where it is incorporated as a part of the complete telephone assembly.

The bell box of the mentioned apparatus includes, besides a ringer, such electrical components as an induction coil and one or more capacitor units. Prior to this invention, it has commonly been the practice to employ several terminal strips on one or both sides of which there are provided screw type terminals plus solder type terminals, both electrically connected to the respective leads from the several components. Conductors having their ends fastened by the screws of the terminals complete the circuit network. As a result of the mentioned arrangement wherein the terminal strips, as well as the induction coil and the capacitors with the interconnecting conductors, are exposed to the atmosphere, current leakage and corrosion take place.

In accordance with the main feature of the invention there is provided a novel substation construction wherein the induction coil, as well as the capacitor units with their interconnecting conductors, are sealed against the atmosphere and are therefore substantially free from corrosion or other electrical failure due to the presence of moisture.

Another feature of the invention relates to the reduction within substation apparatus, of the number of terminals exposed to the atmosphere and to the reduction of long leakage paths between the remaining terminals that are so exposed.

Other features will appear from the detailed description and claims when taken with the drawings in which Fig. 1 is a diagrammatic showing of the substation apparatus construction of the present invention, the portion thereof enclosed by the dotted rectangle representing the equipment to be mounted within the bell box or desk stand base;

Fig. 2 is a schematic showing of the circuits and apparatus of Fig. 1;

Fig. 3 is a top view of a sealed assembly unit for mounting within the bell box or base of a cradle type desk stand, indicated in dotted lines;

Fig. 4 is a vertical section through the unit of Fig. 3; and

Fig. 5 is a bottom view of this unit.

In Figs. 1 and 2, there is shown by way of example the arrangement of one type of conventional antiside tone telephone substation circuit incorporating the present invention, although the invention is not to be limited to this disclosure since it is applicable to various types of substation circuits either with or without a dial sender. The telephone circuit as shown most simply in Fig. 2, includes within the bell box or in the base of the cradle desk stand (indicated in dotted lines in Fig. 4), a ringer 5, ringer capacitor units 6 and 7, inductance coil 8 and the capacitor 9 associated with the receiver circuit. The transmitter 10 and receiver 11, as well as the finger wheel (not shown) of the dial 12, are located outside of the box or desk stand, as the case may be, although the dial mechanism proper, together with the impulse springs 13 and shunt springs thereof are enclosed within the bell box.

In this substation telephone circuit, one side L1 of the telephone line extends through the impulse springs 13 of the dial, thence through one winding 14 of the induction coil, conductor 15 through the transmitter 10, conductor 16 and X contacts of the hook-switch, to the other side L2 of the telephone line. There is bridged across the terminals of the transmitter 10, a circuit including the receiver 11, conductor 17, Y contacts of the hook-switch, capacitor 9, and the induction coil winding 19, and in parallel with the receiver 16, there is connected the winding 20 of the induction coil, all in accordance with a conventional type of antiside tone circuit. The ringer 5 is bridged across the line conductors L1 and L2 in series with the capacitor elements 6 and 7 which are connected in parallel. It should be mentioned that the parallel arrangement of the capacitors is provided since the capacitance of the two elements is necessary to one type of ringer while a single one of these elements suffices for another type of ringer.

In a substation circuit, diagrammatically illustrated in Fig. 1, the capacitor 9 and capacitor elements 6 and 7, as well as the windings of the induction coil 8 are enclosed in a receptacle 25, illustrated in Figs. 3, 4 and 5, wherein these elements are embedded and sealed in a moisture-proof compound. It will be noted from Fig. 1 that the conductors connecting these electrical elements are contained within the receptacle in order to be embedded in the compound. This arrangement permits soldered connections between the conductors and the outlet leads of these mentioned elements. The sealing of these conductors and the soldered connections prevents corrosion and also tends to obviate electrical leakage between the conductors. The receptacle comprises a generally rectangular, rather shallow container open at the front, as viewed in Fig. 5. Two opposing sides of the receptacle are provided with pairs of perforated lugs 26 by which the container can be mounted in a bell box or within the base of the cradle telephone. The inner portion of the receptacle is provided with ribs 27 which, with the side walls of the receptacle, define three areas to receive the induction coil 8 and the two capacitor elements 6 and 7, as well as capacitor unit 9. These ribs tend to hold the electrical units in spaced relation during the time that the compound is being poured into the receptacle to immerse and seal these units and the conductors connected therebetween. Certain of these conductors are indicated only in Fig. 4. The right-hand end of the receptacle, as illustrated, is off-set to provide a shoulder 28. This shoulder is provided with a series of connection terminals, such as 40, which are molded in the receptacle at the time when it is made. It will be noted from Fig. 4 that the lower end of each connection terminal is embedded in the sealing compound. Thus, there is no danger of electrical leakage or corrosion where the conductor, connected to the lower end of this terminal within the receptacle, is embedded in the sealing compound. However, the upper end of the terminal is exposed at the shoulder 28 to provide a screw type connection to an external circuit. The upper surface of the shoulder 28 is provided with a series of upstanding ribs 30 which tend to increase the length of possible leakage paths between adjacent terminals. The left end of the receptacle, as viewed in Fig. 4, is stepped to provide a pair of shoulders 33 and 34 similar to the shoulder 28. The shoulders 33 and 34 are likewise provided with a series of connection terminals similar to those already described. Ribs 36 and 37 are provided on the upper surfaces of the shoulders to separate adjacent connector terminals.

While the circuit network of the substation is shown schematically in Fig. 2, the arrangement of the electrical components in the receptacle and the actual wiring of the substation circuit is illustrated in Fig. 1. The arrangement will be understood by tracing the connections through the receptacle. The side L1 of the telephone line is fastened to the screw terminal 40 exposed on the shoulder 28 of the receptacle. From this terminal the connection 41 extends through the sealing compound to the screw terminal 42 with its screw head exposed on the lower shoulder 34 at the left end of the receptacle. From this terminal, the connection extends through the exposed conductor 43, impulse springs 13 of the dial, exposed conductor 44, to the screw terminal 46. From this terminal, the connection extends through the embedded conductor 47, winding 14 of the induction coil, embedded conductor 48, to the terminal 49 on the upper shoulder 33 of the receptacle. Thence the connection extends through the exposed conductor 51 to transmitter 10. From the transmitter, the connection extends through the exposed conductor 52, screw terminal 54 which is internally connected to the screw terminal 55. This terminal is connected by the external conductor 56, through the X contacts of the hook-switch and conductor 57 to the terminal 59. Terminal 59 is connected by the sealed conductor 60 to the terminal 61 located at the shoulder 28, terminal 61 being connected to the other side L2 of the line.

The receiver circuit includes the previously mentioned external conductor 52 and the receiver 11, external conductor 62 to terminal 64 which is internally connected to terminal 65, external conductor 66, Y hook-switch contacts, conductor 67, terminal 68. From this terminal, there extends a sealed conductor 69, through the capacitor 9, sealed conductor 71, winding 19 of the induction coil, sealed conductor 73 to the terminal 49. The third winding 20 of the induction coil, has one of its leads connected by the sealed conductor 76 to terminal 54 and its other lead is connected by the sealed conductor 77 to the terminal 68. The external conductor 78 from the terminal 55 and the external conductor 79 from the terminal 65 extend to the dial shunt springs 80. Incidentally, when the dial sender is not provided, conductors 78 and 79 are omitted. Also the conductors 43 and 44 are omitted and terminals 42 and 46 are strapped together.

The ringer is connected into the network by the sealed conductor 82 which extends from the terminal 61 to terminal 83. The terminal 83 is connected by the external conductor 84 to one side of the ringer 5, while the other side of the ringer is connected by conductor 85 to terminal 86. With certain types of ringers, both capacitor elements 6 and 7 are effective by being connected in multiple by the sealed conductors 88 and 89 to terminals 86 and 87 which are externally strapped together by conductor 90. However, when one of the capacitor elements is sufficient, this strap is omitted. The common terminals of these capacitor elements are connected by the sealed conductor 92 to the terminal 46. Terminal 94 which can be connected to ground is connected by the sealed conductor 95 to the terminal 96. Terminal 96 is used when a ground ringing circuit is employed instead of the ringing circuit shown.

What I claim is:

1. Telephone substation apparatus comprising a transmitter, a receiver, a hook-switch and a ringer, electrical components connectible with said transmitter and receiver, a receptacle having an offset portion defining a shoulder with a surface generally parallel to the bottom of the receptacle at each end thereof, a plurality of terminals mounted in each shoulder to extend in a direction generally perpendicular to the surface of said shoulder, each terminal having an external end accessible from the outside of the receptacle at the mentioned surface of its related shoulder and having its inner end terminating within the receptacle, said electrical components including an induction coil with its several windings and a capacitor contained within the receptacle, conductors within said receptacle electrically connecting said units with one another and with the inner ends of said terminals, a fusible compound in the receptacle sealing said conductors and said components therein, certain of said external terminals being connectible to the two sides of a telephone line, certain others of said external terminals being electrically connected to said transmitter, said receiver and said ringer.

2. Telephone substation apparatus comprising a transmitter, a receiver, a hook-switch and a ringer, electrical components connectible with said transmitter, receiver and hook-switch, a receptacle having a stepped side wall defining a shoulder with a surface generally parallel to the bottom of the receptacle at each end thereof, each shoulder being provided with spaced upstanding ribs on the surface thereof, a plurality of terminals separated from each other and mounted in each shoulder, each terminal having an external end accessible at the outside of the receptacle but separated from the external ends of the other terminals by said ribs and having its inner end terminating within the receptacle, conductors within said receptacle electrically connecting said units with one another and with the inner ends of said terminals, a fusible compound in the receptacle sealing said conductors and said components therein, certain of said external terminals being connectible to the two sides of a telephone line, certain others of said external terminals being electrically connected to said transmitter, said receiver and said ringer.

3. A substation apparatus unit comprising a receptacle containing electrical units including an induction coil and a capacitor, one side of said receptacle having an offset portion to provide a shoulder, terminals, each sealed in said shoulder to have an inner terminal end within the receptacle and an outer terminal end accessible from the exterior of the receptacle, conductors electrically connecting said coil and capacitor to said inner terminal ends.

4. A substation apparatus unit comprising a receptacle having a shoulder at one end thereof and having two shoulders in stepped relation at the other end thereof, a plurality of terminals mounted in each shoulder, each terminal having an external end accessible at the outside of the receptacle and having its inner end terminating within the receptacle, electrical units including an induction coil with its several windings and a capacitor contained within the receptacle, conductors within said receptacle electrically connecting said units with one another and with the inner ends of said terminals, and a fusible compound in the receptacle sealing said conductors and said units therein.

LELAND A. REED.